Figure 1:
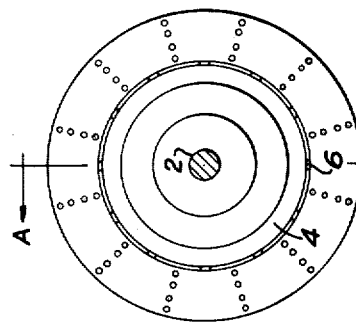

Sept. 3, 1963 W. A. STEWART 3,102,402
MISALIGNMENT DEVICE FOR FLEXIBLE COUPLINGS
Filed Oct. 31, 1962 2 Sheets-Sheet 1

INVENTOR.
WARREN A. STEWART
BY
Leo D. MaLossi
his ATTORNEY

Sept. 3, 1963     W. A. STEWART     3,102,402
MISALIGNMENT DEVICE FOR FLEXIBLE COUPLINGS
Filed Oct. 31, 1962     2 Sheets-Sheet 2
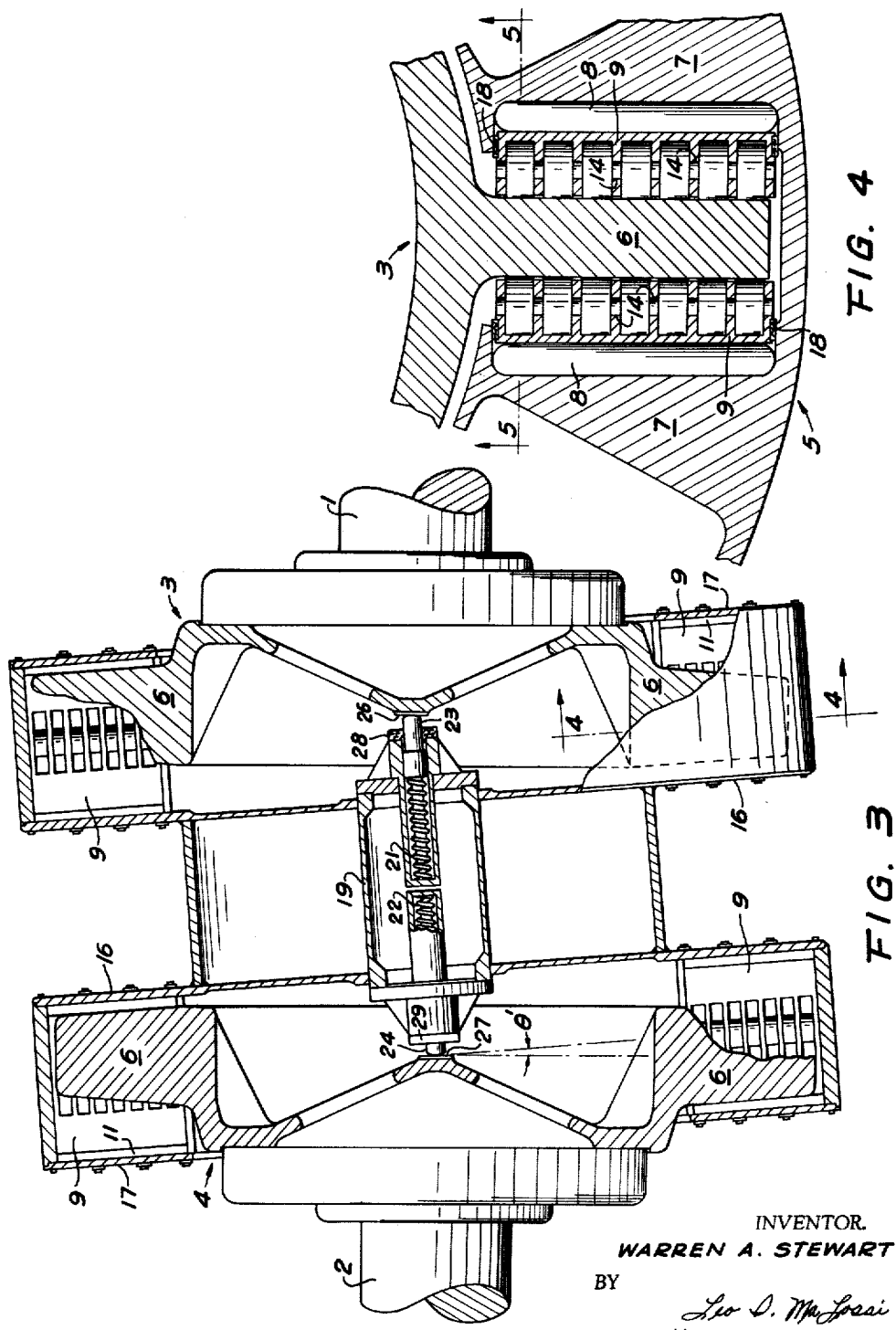
INVENTOR.
WARREN A. STEWART
BY
his ATTORNEY

United States Patent Office 3,102,402
Patented Sept. 3, 1963

3,102,402
MISALIGNMENT DEVICE FOR FLEXIBLE
COUPLINGS
Warren A. Stewart, Monkton, Md., assignor to Koppers
Company, Inc., a corporation of Delaware
Filed Oct. 31, 1962, Ser. No. 234,901
5 Claims. (Cl. 64—14)

This invention concerns improvements in flexible couplings, torsional vibration dampers, dynamic dampers and the like as generally disclosed in U.S. Patent No. 2,621,493 and U.S. Patent No. 2,764,003 issued to L. P. Croset.

In general, such couplings comprise at least two concentric members carrying arms or blades which blades extend radially (or more or less radially) from the said members, are arranged alternately on one and the other member in the circumferential direction defining cells between these alternate blades. In each such cell is disposed at least one elastic member so that one face thereof engages a blade of one of the two concentric members and the opposite face thereof engages a blade of the other concentric member.

Up to the present time, flexible couplings of this type using rubber elements in compression as the elastic members have been very limited in the degree of misalignment to which such couplings may be subjected. Whenever there is misalignment, relative motion is caused between the blades of the inner and outer concentric members producing simultaneously therewith a constantly changing attitude of the faces of the driving blades relative to the faces of the driven blades. This relative motion between blades is opposed by the rubber elements, because of the high coefficient of friction of the rubber. This opposition by the elastic members to the relative motion between blades results in the generation of a first moment of high value which is transmitted to the shafts connected by the given coupling and thereby to the shaft bearings where a reactive moment is provided with eventual damage to these bearings.

Also, this relative motion between blades results in the asymmetrical compression of the rubber elements, and since rubber does not act as a fluid, a high resistance is set up in the zone where maximum compression is induced in the rubber. This high resistance causes generation of a new moment at right angles to the previously mentioned first moment. Thus, an additional moment is transmitted to and must be opposed by the connected shafts.

It is, therefore, the object of this invention to design a torsionally-resilient, flexible coupling permissive of high misalignment between the connected shafts with greatly reduced reactive moments resulting therefrom during operation under conditions of misalignment.

A further object of this invention is to produce a torsionally-resilient flexible coupling having outstanding capacity to attenuate much of the sound energy ordinarily transmitted through flexible couplings of conventional construction.

According to this invention the conventional flexible coupling described above has been modified by the introduction between each blade of the driving concentric member and the rubber elements to either side thereof of means for eliminating relative motion between the rubber material and the surfaces with which it is in contact and simultaneously absorbing both the linear motion and the angular motion attendant the change in attitude between adjacent blades during the rotation of the misaligned connected shafts. Further, an important feature of this novel construction is the fact that the rubber elements employed therein remain at all times under a direct compressive load uniformly distributed over the surface of each rubber element so that asymmetrical distortion of the rubber material and the moment caused thereby is obviated.

Figure 5:
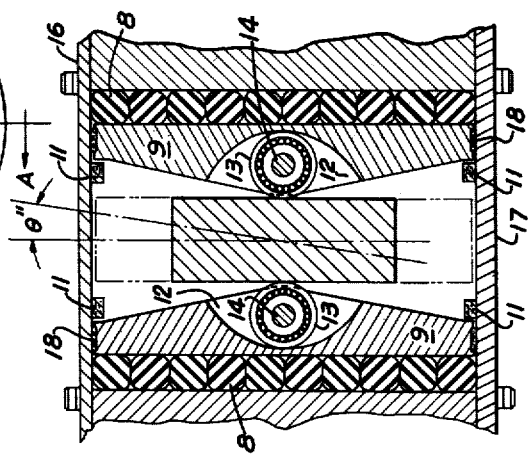
Figure 2:
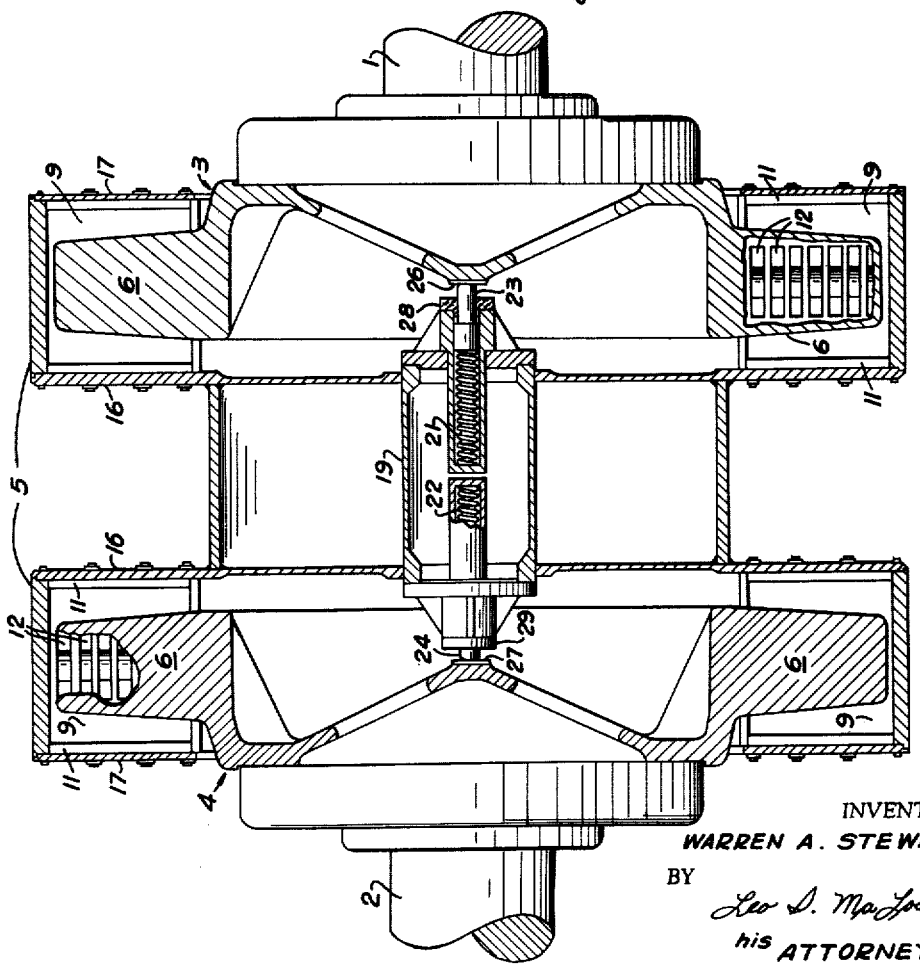

The exact nature of this invention as well as other objects and advantages thereof will be readily apparent from consideration of the following specification relating to the annexed drawing in which:

FIG. 1 is an elevational view of a flexible coupling embodying the present invention, FIG. 2 is a sectional view taken on line A—A of FIG. 1 showing the disposition of the components of the flexible coupling when the connected shafts are in alignment, FIG. 3 is a sectional view taken on line A—A of FIG. 1 showing the disposition of the components of the flexible coupling when the connected shafts are in misalignment, FIG. 4 is a sectional view taken on line 4—4 of FIG. 3 and FIG. 5 is a sectional view taken on line 5—5 of FIG. 4.

Referring to FIGS. 1, 2 and 3, numerals 1 and 2 represent driving and driven shafts respectively. Shafts 1 and 2 carry concentric driving and driven coupling members 3 and 4, which coupling members are interconnected by sleeve 5 and wherein the connections between members 3 and 4 and shafts 1 and 2 respectively are made in the conventional fashion. Torque is, of course, transmitted from driving shaft 1 to driven shaft 2 via coupling member 3, sleeve 5 and coupling member 4. Each of coupling members 3 and 4 are provided on their outer peripheries with substantially flat radially-extending blades 6. The radially-extending blades 7 from sleeve 5 protrude inwardly in alternate arrangement with blades 6 as shown clearly in FIG. 4.

Between each pair of adjacent blades 6, 7 is inserted a novel arrangement of elements comprising an array of separate, rod-like rubber elements 8 arranged in side by side relationship with their longitudinal axes substantially parallel to each other and to the face of blade 6 and with a portion of the surface of each element 8 contacting blade 7. Interposed between each face of blade 6 and the array of rubber elements 8 disposed in opposition thereto is located a pressure plate 9 held in floating contact with rubber elements 8 by fiber restraining strips 11. Each pressure plate 9 is provided with a series of arcuate recesses 12, these recesses 12 being disposed parallel to each other with the flat sides thereof substantially perpendicular to the face of blade 6 contiguous therewith. Rotatably mounted on pressure plate 9 and disposed in recesses 12 are a series of cam follower bearings 13 shown in detail in FIGS. 4 and 5. These bearings 13 are arranged in a row with the bearing shaft 14 thereof aligned parallel to the face of blade 6.

In addition to providing torsional resiliency this coupling has been modified to inhibit the transmission of sound from shaft 1 to shaft 2. At all points where metal-to-metal contact could otherwise transmit sound a sound barrier has been provided. The plurality of rubber elements disposed in each cavity in conventional flexible coupling construction provides some degree of sound isolation between the connected shafts but for special applications the degree of sound isolation is insufficient. To markedly increase the degree of sound attenuation direct contact between pressure plate 9 and end plates 16, 17 is prevented by the interposition therebetween of bumper 18 which encircles pressure plate 9. In addition, retaining strips 11, which prevent unloaded pressure plates 9 from striking hub blades 6, are made of fiber.

Axial centering of sleeve 5 with respect to coupling members 3 and 4 is provided by centering device 19. Within centering device 19 are mounted high-rate springs 21, 22 disposed in opposition to each other and also to resist any movement of the sleeve away from center. Springs 21, 22 act upon small piston 23, 24 respectively in contact with the center plates 26, 27 of coupling members 3 and 4 respectively. This centering arrangement is also provided with sound-dampening construction in the form of fiber centering discs 28, 29 slidably supporting the shanks of pistons 23, 24 respectively.

During the cycle of rotation of the coupling (driving and driven members 3 and 4 and sleeve 5), if shafts 1 and 2 are misaligned, blades 6 will move in the axial direction with respect to sleeve blades 7 through the angle ±θ'. This angular displacement and the positions assumed by the coupling components is clearly shown in FIG. 3.

During the same cycle of rotation the major axis of blade 6 will rotate relative to the major axis of blade 7 through the angle ±θ" as shown in FIG. 5.

Assuming that blade 6 is the driving member, blade 6 imposes a force on bearings 13, which force is transmitted to pressure plate 9 through the bearing shaft 14 and from pressure plate 9 through rubber elements 8 to sleeve blade 7. As blade 6 moves through the arc ±θ', driving contact is maintained with bearings 13, which members merely rotate about their axis meanwhile continuously maintaining contact with blade 6 and retaining the center line of pressure plate 9 via the longitudinal axis of shaft 14 as the direction for the transmission of load from blade 6 to blade 7. Likewise, as blade 6 rotates through the angle ±θ", bearings 13 simply rotate on their axis thereby always maintaining contact with blade 6 and continuing to transmit the load to pressure plate 9 in the fashion described above with respect to rotation through arc ±θ'.

Although the arrangement described herein employs a three-component coupling (driving and driven members 3 and 4 respectively and sleeve 5), it should be manifest to those skilled in this art that the invention is equally applicable to flexible coupling construction wherein the coupling consists solely of a driving coupling member similar to driving member 3 described herein and a driven coupling member provided with inwardly directed blades similar to blades 7 of sleeve 5.

The novel construction described herein permits the design of a torsionally-resilient, sound-attenuating coupling with a lower reactive moment than conventional coupling construction and is, therefore, particularly adaptable to applications presenting the problem of high misalignment. Although it is known that this invention will produce a coupling permitting a 4°20' misalignment, it is not expected that this is an upper limit for this construction.

It should be understood, of course, that the foregoing disclosure relates to only a preferred embodiment of the invention and that numerous modifications or alterations may be made therein without departing from the spirit and the scope of the invention as set forth in the appended claims.

What is claimed:
1. A flexible device comprising
   (a) a driving element,
   (b) a driven element,
   (c) a first rotary member connected to one of said elements,
   (d) a first set of spaced apart projecting blades on said first rotary member,
   (e) a second rotary member connected to the other element,
   (f) a second set of spaced apart projecting blades on said second rotary member,
       (1) said second set of blades being in alternating arrangement with said first set of blades,
       (2) said alternating blades forming cells between the first and second rotary members,
   (g) walls closing the ends of said cells,
       (1) said walls being spaced apart a fixed distance axially of said device,
   (h) a plurality of elastic force-transmitting elements in each cell arranged in side by side relationship and in contact with the surface of the blade from said second set of blades,
   (i) a pressure plate interposed between said plurality of elastic force-transmitting elements and the blade from said first set of blades,
       (1) said pressure plate having a plane surface in contact with said plurality of elastic force-transmitting elements and facing the surface of said blade from said second set of blades,
   (j) a follower element rotatably mounted on said pressure plate with the central axis about which said follower element rotates disposed in a generally radial direction parallel to the surface of said blade of said first set of blades and with a portion of the surface of said follower element contacting with said blade of said first set of blades
whereby force from said first rotating member is transmitted to said second rotating member along the axis of rotation of said rotating element.

2. A flexible device substantially as described in claim 1 wherein the elastic force-transmitting elements have a rod-like shape and are disposed in side by said relationship with the longitudinal axis of each element parallel to the face of the blade of the first set of blades forming one wall of the cell.

3. A flexible device substantially as recited in claim 2 wherein the pressure plate is restrained in floating contact with the plurality of elastic force-transmitting elements.

4. A flexible device comprising
   (a) a driving element,
   (b) a driven element,
   (c) a first rotary member affixed to said driving element,
   (d) a second rotary member affixed to said driven element,
   (e) spaced apart projecting blades on said first and second rotary elements,
   (f) a sleeve member connecting said first and second rotary elements,
   (g) spaced apart projecting blades on said sleeve member,
       (1) the blades from said sleeve member projecting alternately between the blades of said first rotary member at the one end of said sleeve member and projecting alternately between the blades of said second rotary member at the other end of said sleeve member,
       (2) said alternating blades forming a first set of cells between said first rotary member and said sleeve member on the one hand and forming a second set of cells between said second rotary member and said sleeve member on the other hand,
   (h) spaced-apart walls closing the ends of each of said cells,
   (i) a plurality of elastic force-transmitting elements in each cell arranged in side by side relationship and in contact with the surface of one of said alternating blades forming the cell,
   (j) a pressure plate interposed between said elastic force-transmitting elements and the other alternating blade in said cell,
       (1) said pressure plate having a plane surface in floating contact with said plurality of elastic force-transmitting elements and facing the surface of said one of said alternating blades, (k) a freely rotatable member mounted on said pressure plate, a portion of the surface of said member being in contact with the surface of said other alternating blade whereby loads are transmitted through said cell from said other blade of said alternating blades through said rotating member to said pressure plate and then from said pressure plate through said elastic force-transmitting elements to said one of said alternating blades.

5. A flexible device comprising
   (a) a driving element,
   (b) a driven element,
   (c) a first rotary member connected to one of said elements,
   (d) a first set of spaced apart projecting blades on said first rotary member,
   (e) a second rotary member connected to the other element,
   (f) a second set of spaced apart projecting blades on said second rotary member,
      (1) said second set of blades being in alternating arrangement with said first set of blades,
      (2) said alternating blades forming cells between the first and second rotary members,
   (g) walls closing the ends of said cells,
      (1) said walls being spaced apart a fixed distance axially of said device,
   (h) a plurality of elastic force-transmitting elements in each cell arranged in side by side relationship and in contact with the surface of the blade from said second set of blades,
   (i) a pressure plate interposed between said plurality of elastic force-transmitting elements and the blade from said first set of blades,
      (1) said pressure plate having a plane surface in contact with said plurality of elastic force-transmitting elements and facing the surface of said blade from said second set of blades,
   (j) a freely rotatable member mounted on said pressure plate,
      (1) a portion of the surface of said member being in contact with the surface of said blade of said first set of blades.

References Cited in the file of this patent
UNITED STATES PATENTS

| 1,245,695 | Francke | Nov. 6, 1917 |
| 1,648,078 | Thomsen | Nov. 8, 1927 |

UNITED STATES PATENT OFFICE
CERTIFICATE OF CORRECTION

Patent No. 3,102,402 September 3, 1963

Warren A. Stewart

It is hereby certified that error appears in the above numbered patent requiring correction and that the said Letters Patent should read as corrected below.

Column 4, line 29, for "said" read -- side --.

Signed and sealed this 25th day of February 1964.

(SEAL)
Attest:
ERNEST W. SWIDER

Attesting Officer

EDWIN L. REYNOLDS
Acting Commissioner of Patents